United States Patent [19]

Smith

[11] 4,426,580

[45] Jan. 17, 1984

[54] DETECTION DEVICE

[75] Inventor: Jay E. Smith, Pittsburgh, Pa.

[73] Assignee: The United States of America as represented by the United States Department of Energy, Washington, D.C.

[21] Appl. No.: 494,500

[22] Filed: May 18, 1983

Related U.S. Application Data

[63] Continuation of Ser. No. 239,227, Feb. 27, 1981.

[51] Int. Cl.³ .................. G01T 1/18; G01N 23/00
[52] U.S. Cl. ......................... 250/374; 250/359.1; 250/379
[58] Field of Search ............... 250/358.1, 359.1, 360.1, 250/374, 379; 313/93; 378/57

[56] References Cited

U.S. PATENT DOCUMENTS

| 3,137,793 | 6/1964 | Preston | 250/379 |
|---|---|---|---|
| 3,603,831 | 9/1971 | Kimmel | 313/93 |
| 3,935,464 | 1/1976 | Zingaro | 250/379 |
| 4,020,346 | 4/1977 | Dennis | 378/57 |
| 4,158,774 | 6/1979 | Stokes | 250/374 |

Primary Examiner—Janice A. Howell
Attorney, Agent, or Firm—Michael F. Esposito

[57] ABSTRACT

The present invention is directed to a detection device comprising: (1) an entrance chamber, (2) a central chamber, and (3) an exit chamber. The central chamber includes an ionizing gas, anode, and means for connecting the anode with an external power supply and pulse counter.

4 Claims, 1 Drawing Figure

U.S. Patent
Jan. 17, 1984
4,426,580
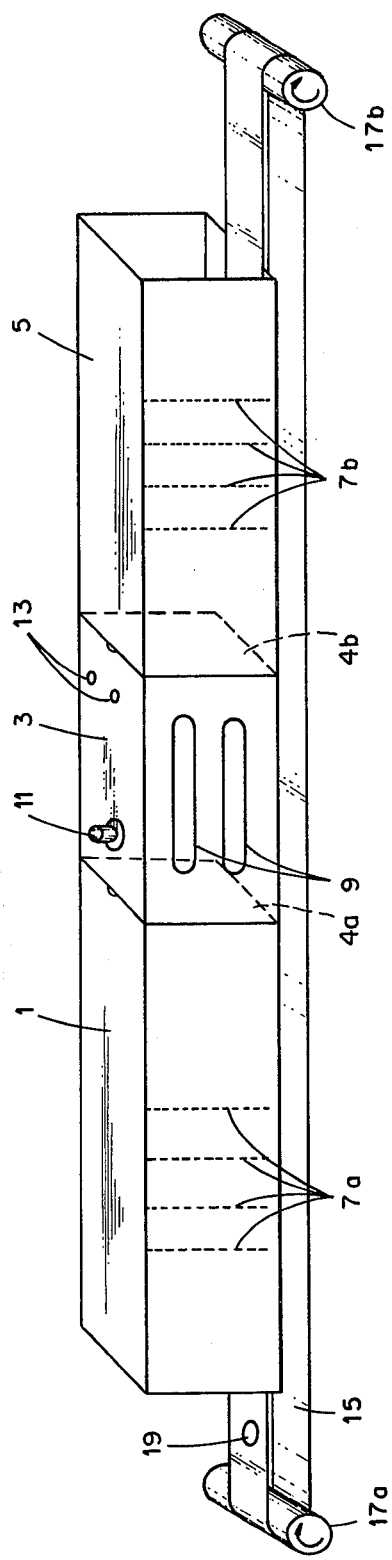

DETECTION DEVICE

The Government has rights in this invention pursuant to Contract No. EY-76-C-11-0014 between the Department of Energy and Westinghouse Electric Corporation.

This is a continuation of application Ser. No. 239,227, filed Feb. 27, 1981.

BACKGROUND OF THE INVENTION

This invention is directed to a new and improved device for the detection of surface contamination due to radiation. In particular, the present invention relates to a new and improved device for detecting surface alpha contamination on various odd-shaped metal components.

Presently, there exists a requirement for the development of a detection device for measuring surface alpha contamination on odd-shaped metal components. This requirement arises because of the problem discovered in making a determination as to the disposition of metal working machinery that has been used in processing radioactive materials which emit alpha particles. It is the ultimate goal of the person involved in disposition of this machinery to decontaminate such machinery for (1) unrestricted reuse or (2) disposal as "clean" scrap. To accomplish these goals requires at least three process steps including (1) disassembly of the machinery, (2) decontamination of the disassembled components, and (3) testing to verify the adequacy of decontamination. The present invention is directed to a means of performing the verification procedure of step (3).

Upon disassembly of a piece of machinery one is left with a large number of differently (e.g. odd) shaped metal objects such as belts, brackets, gears, shafts, etc. The large reasonably flat surface articles are rather easily tested for surface alpha contamination with existing equiment. However, at present, there is no way to detect alpha contamination on the concave surface of most articles (e.g. teeth of bevel gears). This invention provides a means for detecting contamination on these types of articles.

The difficulty in detecting surface contamination on these types of articles originates from the fact that alpha particles (1) have a range in air which is quite short, and (2) can be stopped by almost anything as thick as a sheet of paper. Accordingly, to detect surface alpha contamination one must get the sensitive volume of the detector near enough to the surface being tested. Therefore, the choice of detectors appears to be limited to (1) one with a very thin, pliable, durable window which can wrap around and conform to an arbitrarily shaped article; (2) one or more custom built detectors for each object being tested, or (3) a very small detector which would fit into concave areas and could be used to scan the surface manually. The first choice appears to be impossible while the second and third options are clearly impractical considering the number and variety of the equipment involved. Accordingly, it is evident that the discovery of a practical means of detecting surface alpha contamination on odd-shaped metal components remains a problem.

SUMMARY OF THE INVENTION

It is the primary object of the present invention to provide new and improved means for detecting surface alpha contamination on odd-shaped metal articles.

It is a further object of the present invention to provide a new and improved means for detecting surface alpha contamination on concave shaped metal articles.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the present invention, as embodied and broadly described herein, the apparatus of this invention may comprise a housing having an entrance chamber, a detection chamber and an exit chamber; means disposed within the housing and at least in part passing through the chamber for conveying the articles through the chambers; means for electrically grounding at least part of the conveying means passing through the detection chamber; means for supplying an ionizing gas to the detection chamber; an anode in the detection chamber; an electrical supply connected to the anode for charging the anode and establishing an electric field in the detection chamber; a pulse counter coupled to the anode for detecting pulses produced by ionization of the gas by alpha particles; and means carried by the housing for substantially confining the ionizing gas in the detection chamber and restricting outflow through the entrance and exit chambers.

In a preferred embodiment of the present invention the detection chamber includes plexiglass air locks located at each end of the chamber. The air locks act to maintain the ionizing gas within the central chamber.

In another preferred embodiment of the present invention the conveying means includes a grounded metal conveyor belt.

In a further preferred embodiment of the present invention the container for said central chamber is made of a metal such as stainless steel.

In still another preferred embodiment of the present invention the ionizing gas is selected to include about 90% argon and about 10% methane.

The apparatus of the present invention is based upon a new and improved modification of an ionization proportional detector having a very thin, pliable, and durable window. Applicant has recognized that the thinnest, most durable, most pliable window possible is no window at all. Applicant has discovered that it is possible to construct an ionization proportional detector large enough to contain each of the articles being tested. Therefore, the surface of the article being tested becomes the boundary of the detector and the provision of a window for the detector is eliminated. Unlike prior art devices, the detector of the present invention has the capability of surveying odd-shaped articles (i.e. concave articles) for surface alpha contamination.

BRIEF DESCRIPTION OF THE DRAWING

The accompanying drawing, which is incorporated in and forms a part of the specification, illustrates a preferred embodiment of the present invention and, together with the description, serves to explain the principles of the invention. In the drawing:

The FIGURE is a perspective view of the apparatus of the present invention.

Reference will now be made in detail to the present preferred embodiment of the invention, an example of which is illustrated in the accompanying drawing.

DETAILED DESCRIPTION OF THE INVENTION

With reference to the FIGURE a detailed description of the device of the present invention will now be set forth. The housing having an entrance, a detection and an exit chamber for the device are illustrated as rectangular containers 1, 3, and 5, respectively. It should be understood that containers 1, 3, and 5 are not limited to rectangular shapes but may have any conventional configuration. Chambers 1 and 5 function to minimize air flow into container 3. This function is accomplished by equipping chambers 1 and 5 with gas (e.g. air) flow restricting means 7(a) and 7(b), respectively. Preferably, restriction means 7(a) and 7(b) comprise closely spaced ball chains (key chains) hanging from the roof of chambers 1 and 5. Other conventional curtain type gas flow restriction means may be used as replacements for or complements to the ball chain curtains described.

The central chamber illustrated by container 3 is provided with anode 9 and plexiglass air locks 4(a) and 4(b), respectively. Anode 9 may comprise a small diameter positively charged counting wire lined about the top and/or two sides of container 3. In a preferred embodiment anode (wire) 9 may be positioned on a horizontal frame (not shown) and suspended from the top of container 3. The horizontal frame is movably mounted enabling the placement of anode 9 at an optimum distance above the components being surveyed for contamination. Container 3 is also provided with gas supply means 11 which is connected to a conventional source of ionizing gas (not shown) such as a standard gas cylinder fitted with a pressure regulator and flowmeter. The ionizing gas supplied to container 3 may be P-10. P-10 is a conventional ionizing gas mixture comprising about 90% argon and about 10% methane. Electrical connections 13 designate the connecting means for attaching an electrical power supply and standard pulse counter (not shown) which records any alpha contamination to anode (9). In a preferred embodiment container 3 comprises a stainless steel box equipped with plexiglass airlocks.

Grounded metal belt 15 is mounted on drive rollers 17(a) and 17(b) and transports metal article 19 thru containers 1, 3, and 5. While the conveying means is illustrated by metal belt 15 it should be understood that other conveying means such as sliding trays may be utilized. However, it is essential that any conveying means be made of metal and be grounded.

The device of the present invention operates in the following manner. After article 19 has been decontaminated, it is placed on belt 15. Belt 15 transports article 19 into the entrance chamber illustrated as container 1. Article 19 moves slowly through the series of gas flow restricting curtains 7(a) which substantially impede any atmospheric air from accompanying article 19 into the central chamber illustrated as container 3. In addition, container 3 will be kept under slight positive pressure due to the gas flow. This also will tend to prevent any external gases from entering the container. The spacing of articles 19 on the belt 15 is such as to enable only one article to be within the active central chamber at any one time.

When metal article 19 enters the central chamber (container 3), any alpha particles emitted from its surface will interact with the ionizing gas (P-10) within a very short distance and result in ionization of the gas in the chamber. Anode (wire) 9 is positively charged to a high voltage (e.g. 1000—1300 volts). Because metal article 19 is an electrical conductor and is in direct contact with grounded metal conveyor belt 15, the electric field lines are everywhere perpendicular to the surface of article 19 and terminate at anode 9. Accordingly, the free electrons created by ionization of the gas in container 3 are accelerated toward the positively charged anode 9 along the electric field lines. The acceleration of the electrons along the electric field lines enables detection of ionizing occurring at non-line-of-sight positions from the anode wire. This characteristic of following the electric field lines which curve around the surface of metal article 9 is responsible for the ability of the device to detect contamination located in holes and crevices. As the electrons approach anode 9, they are accelerated by the convergent nature of the field and cause additional ionizations of the gas. Thus, many more electrons hit anode 9 than were ionized by alpha particles. This gas multiplication of electrons is necessary to produce a pulse strong enough to be counted by the counter (not shown) connected to anode 9 by connection 13. The counter may be any conventional instrument package. For example a standard Nuclear Instrument Module (NIM-BIN) whose components include a low voltage power supply, high voltage power supply, preamplifer, spectrocopic amplifier, single channel analyzer, scaler, ratemeter and a timer may be utilized.

After article(s) 19 is surveyed in container 3, it continues via belt 15 through the exit chamber illustrated as container 5. Article(s) 19, exiting container 5 is separated according to the results received during surveying in container 3. Uncontaminated articles are placed into a "clean" scrap bin while contaminated articles are placed into a separate bin for further processing.

While not being limited to any particular theory it has been postulated that the ability of the apparatus of the present invention to detect contamination in crevices and holes of articles is due to the fact that free electrons created during ionization are accelerated toward the anode along the electric lines of force created by charging the anode. This acceleration of electrons along the lines of force permit detection of ionizing events occurring at non-line-of-sight positions from the anode.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. Apparatus for detecting alpha contamination on the surface of metal articles comprising;
    a housing having an entrance chamber, a detection chamber and an exit chamber;
    means disposed within the housing and at least in part passing through said chambers for conveying the articles through said chambers;

means for electrically grounding at least the part of said conveying means passing through said detection chamber;

means for supplying an ionizing gas to said detection chamber;

an anode in said detection chamber;

an electrical supply connected to said anode for charging said anode and establishing an electrical field in said detection chamber;

a pulse counter coupled to said anode for detecting pulses produced by ionization of the gas by alpha particles; and means carried by said housing for substantially confining the ionizing gas in said detection chamber and restricting outflow thereof through said entrance and exit chambers.

2. The apparatus of claim 1 wherein said conveying means includes a grounded metal conveyor belt.

3. The apparatus of claim 1 wherein said container for said detection chamber is made of stainless steel.

4. The apparatus of claim 1 wherein said ionizing gas supplied to said detection chamber includes a mixture of about 90% argon and about 10% methane.

* * * * *